Oct. 30, 1951  A. B. SCHOLES ET AL  2,573,365
APPARATUS FOR FABRICATING INSULATING
MEMBERS FOR LAMP BASES AND THE LIKE
Filed Oct. 4, 1947

INVENTORS
Addison B. Scholes, Oliver Mann
BY
Lawrence Burns,
ATTORNEY

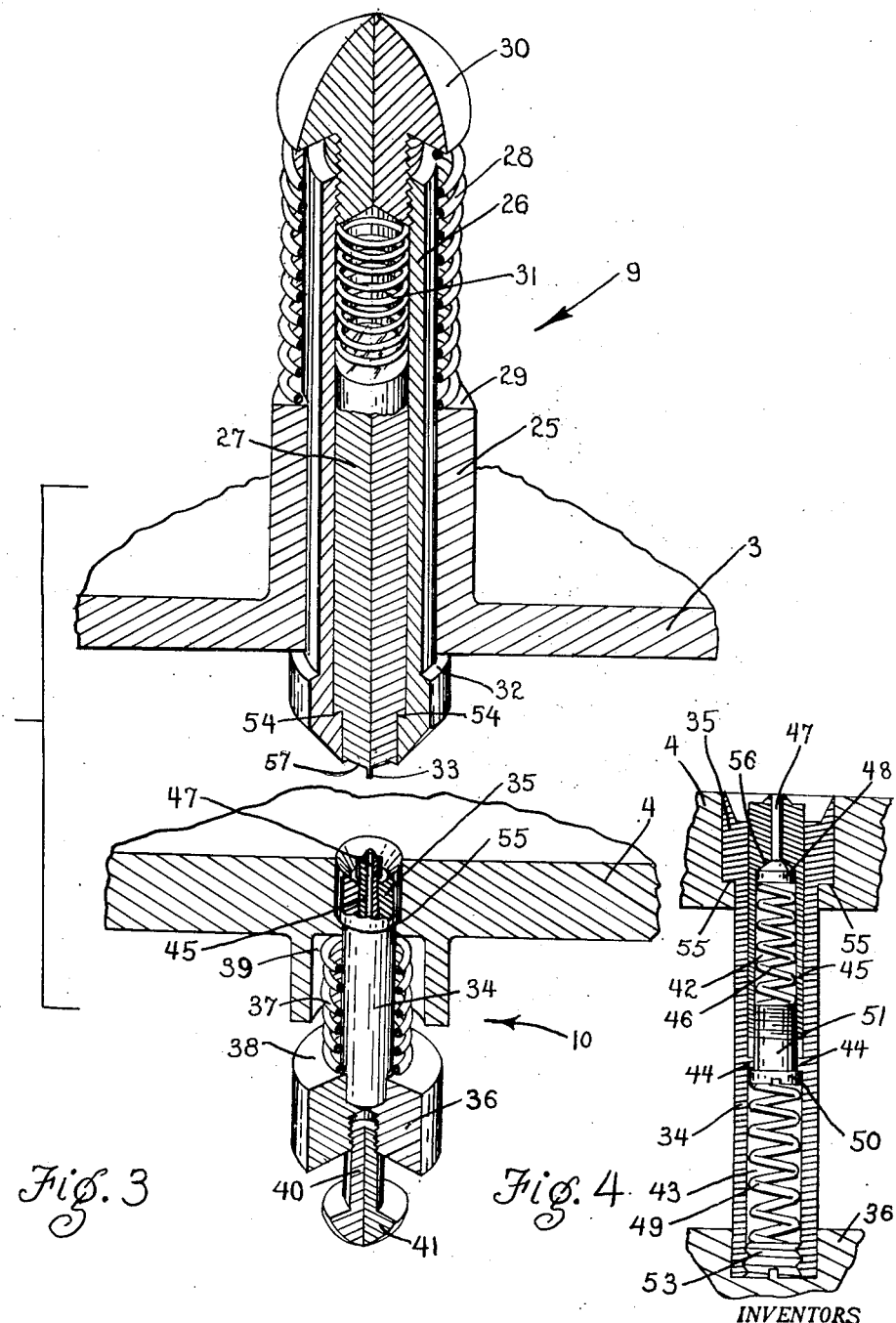

INVENTORS
Addison B. Scholes, Oliver Mann
BY
ATTORNEY

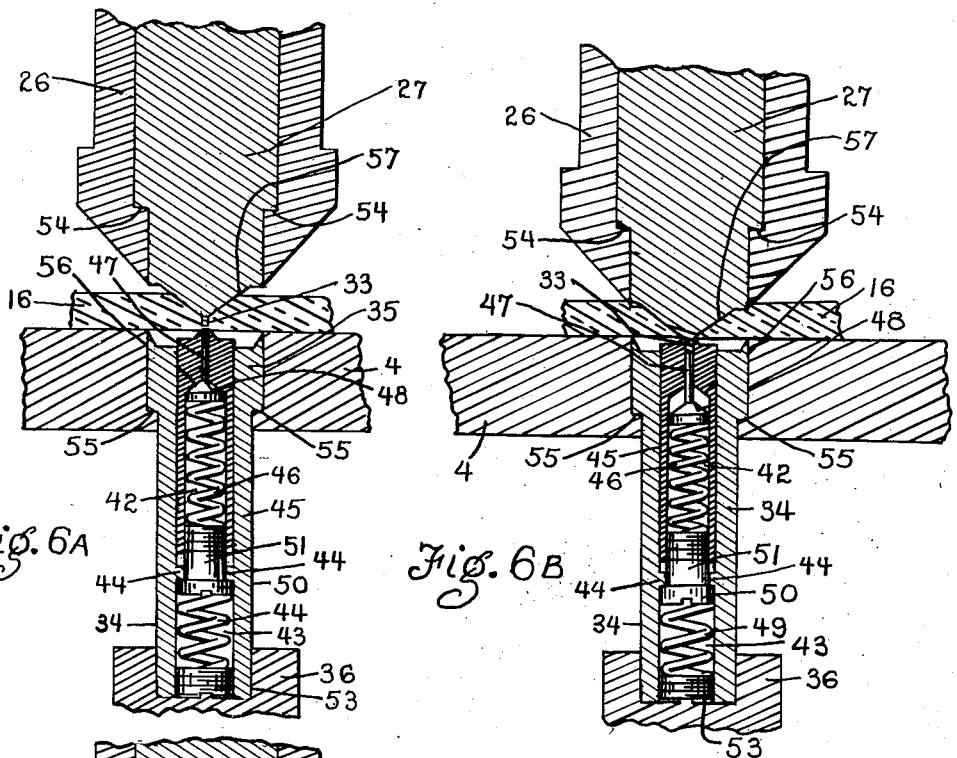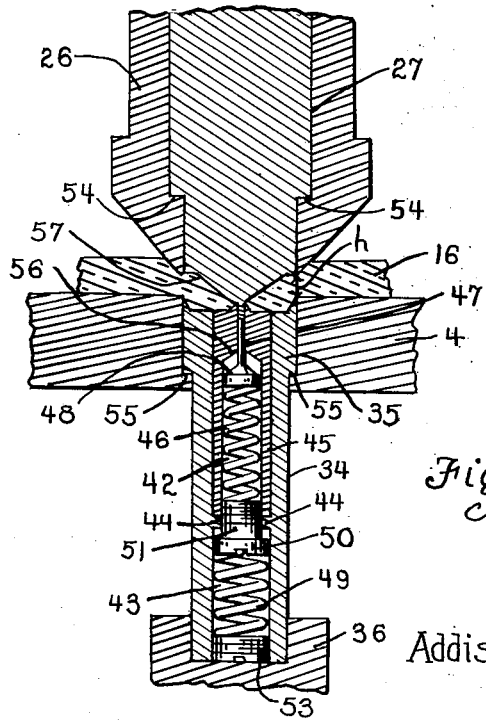

Oct. 30, 1951 — A. B. SCHOLES ET AL — 2,573,365
APPARATUS FOR FABRICATING INSULATING
MEMBERS FOR LAMP BASES AND THE LIKE
Filed Oct. 4, 1947 — 6 Sheets-Sheet 5

INVENTORS
Addison B. Scholes, Oliver Mann
BY
ATTORNEY

Oct. 30, 1951     A. B. SCHOLES ET AL     2,573,365
APPARATUS FOR FABRICATING INSULATING
MEMBERS FOR LAMP BASES AND THE LIKE

Filed Oct. 4, 1947                   6 Sheets-Sheet 6

INVENTORS,
Addison B. Scholes, Oliver Mann
BY
ATTORNEY

Patented Oct. 30, 1951

2,573,365

UNITED STATES PATENT OFFICE 2,573,365

APPARATUS FOR FABRICATING INSULATING MEMBERS FOR LAMP BASES AND THE LIKE

Addison B. Scholes, Georgetown, and Oliver Mann, Danvers, Mass., assignors to Sylvania Electric Products Inc., Salem, Mass., a corporation of Massachusetts Application October 4, 1947, Serial No. 777,938

4 Claims. (Cl. 49—5)

This invention relates to electric lamps, especially incandescent lamps, and more particularly to apparatus for fabricating the insulating end member which is a part of the base with which such lamps are provided.

The conventional base for incandescent lamps and similar devices is usually fabricated by disposing a threaded metal shell and a metal eyelet in a pre-determined relative position in a suitable block or jig. Molten glass is then poured into this assembly and, when it has cooled to the desired viscosity, it is molded and pressed into shape by means of a plug or die of desired form. In this method the metal shell is weakened by the annealing resulting from the heat of the molten gob of glass. Another disadvantage is the task of cleaning and pickling the completed base to remove the oxide formed by this heat.

An object of this invention is to provide an apparatus for fabricating buttons of insulating material for electric lamp bases.

Further objects, advantages, and features will be apparent from the following specification when read in conjunction with the accompanying drawings in which:

Figure 3 is an enlarged perspective view partly in section showing the details of the upper and lower molds of the apparatus.

Figure 4 is a fragmentary sectional view of the lower mold.

Figures 6A–6H are fragmentary sectional views of the upper and lower molds showing their relative position at various stages in the button fabricating operation.

The apparatus of our invention embodies the idea of fabricating buttons of insulating material from a stream or ribbon of molten glass or other moldable insulating material by the action of a pair of molds thereon. The apparatus of our invention is of such a nature that it readily lends itself to adaptation thereof to various types of machines. For example, the apparatus of our invention may be employed on a conveyor type mechanism in which a stream of molten glass is deposited on the conveyor and a plurality of molds disposed in position to act on the stream of glass to form the button. Alternatively, a rotatable turret type machine with a plurality of molds mounted in the turret may be employed. The apparatus of our invention is described below with reference to a rotatable turret type machine. However, its application to other types of machines will be readily apparent to those skilled in the art.

In the rotatable turret type machine, a continuous stream of molten glass or other moldable insulating material is fed from a suitable tank to the machine. The machine is provided with an upper and a lower turret which rotate together on a vertical axis. The upper and lower turrets are provided with a plurality of upper and lower molds respectively. The molding action is effected by two stationary cams, one mounted in position to actuate the upper molds and the other mounted in position to actuate the lower molds.

Figure 1:
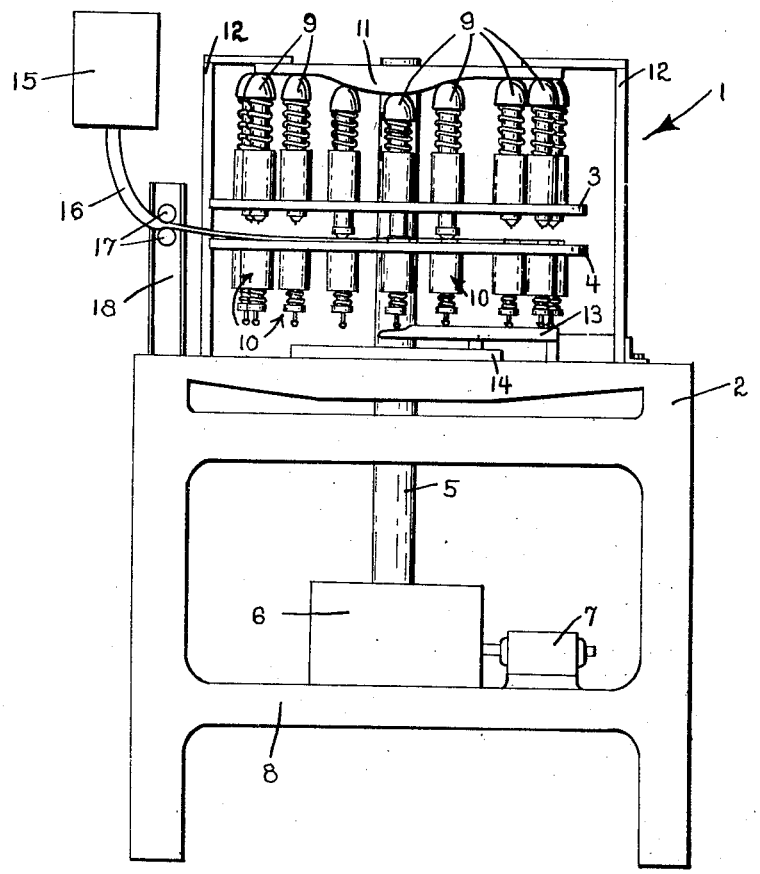
Figure 1 is a side elevational view of the apparatus of our invention with certain parts thereof shown schematically.

In Figure 1 the button molding machine 1 of our invention is mounted on a table 2. The machine 1 is provided with an upper turret 3 and a lower turret 4 which are keyed to a shaft 5. The shaft 5 is turned by suitable conventional gearing mechanism 6 which is driven by a motor 7. The gearing mechanism 6 and the motor 7 are mounted on a shelf 8 of the table 2. The upper turret 3 is provided with a plurality of upper or male molds 9 disposed about the periphery thereof. The lower turret 4 is similarly provided with a plurality of lower or female molds 10. Actuation of the upper molds 9 is effected by their engagement with a stationary cam 11 supported in position by the brackets 12. Actuation of the lower molds 10 is effected by their engagement with a stationary cam 13 mounted on a plate 14 on the table 2.

Figure 2:
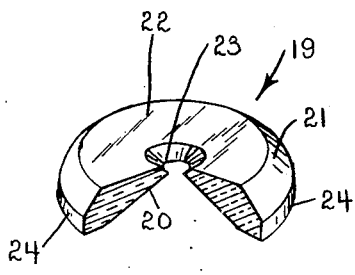
Figure 2 is a perspective view partially broken away, of the glass button which the apparatus of Figure 1 is designed to fabricate.

The molten glass from which the buttons are fabricated is fed to the machine from a glass tank 15 which is provided with an orifice from which a continuous stream of glass 16 flows. This stream of glass, which may be molten cane or tubing, is flattened by rollers 17 mounted in brackets 18 as it is drawn from the tank and fed into the button molding machine. Although cane or tubing may be employed, we have found it preferable to use tubing because it offers the advantage of increased width with decreased glass weight and it does not require a complicated and expensive system to effect the flattening operation. The ribbon of glass 16 is directed from the rollers 17 onto the lower turret 4 where it is engaged by the molds 9 and 10 and the button 19, shown in Figure 2, is fabricated therefrom.

Figure 5:
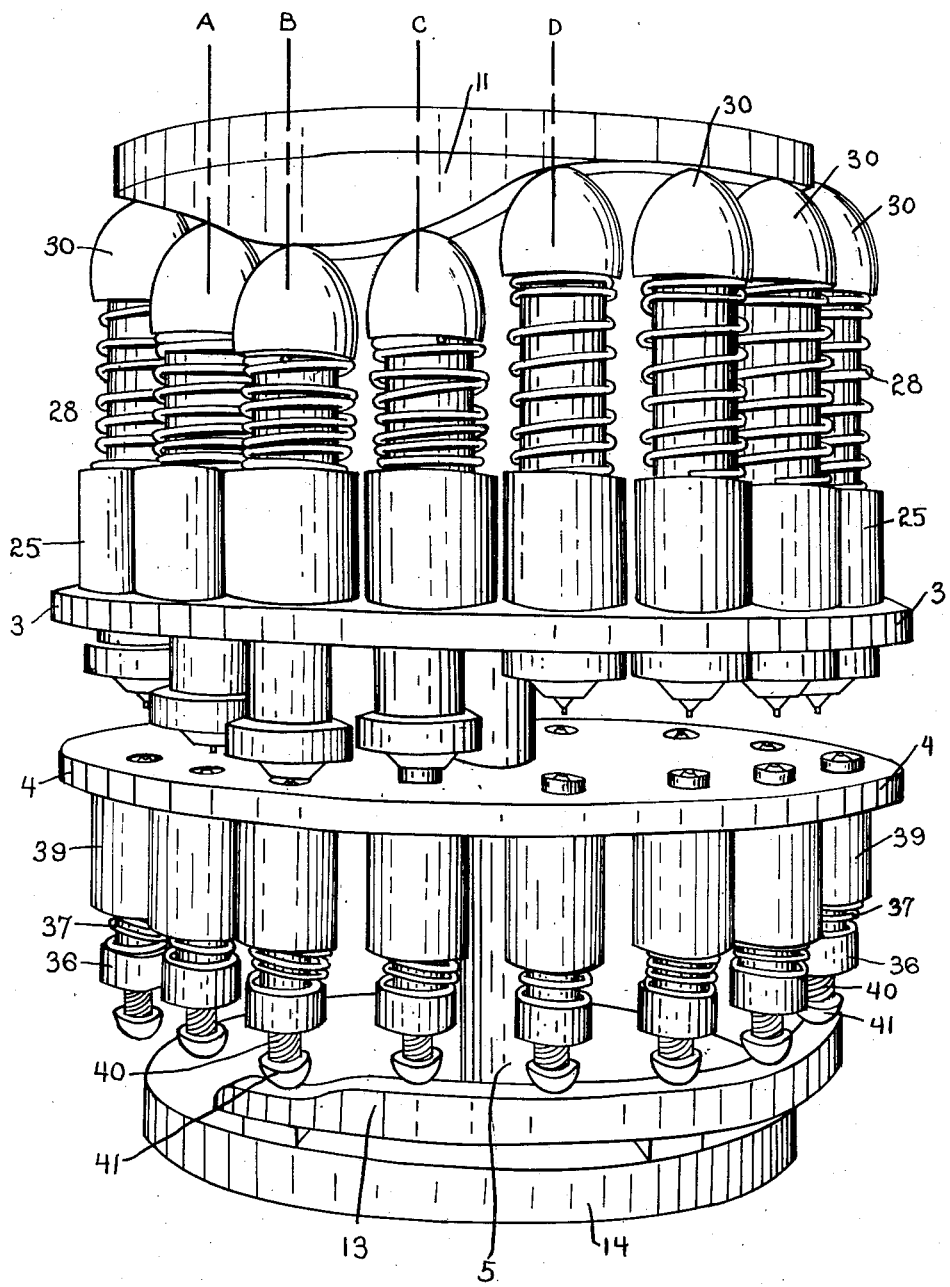
Figure 5 is a perspective view of a portion of the apparatus showing the positions which the molds assume at various stations in the fabrication of the glass button.

The button 19 is a concave member having an inner cone 20, an outer cone 21, a flat base 22, a centrally located aperture 23 in the base 22, and a vertical section 24. The fabrication of the button 19 from the ribbon of glass is accomplished by the action of the molds 9 and 10 thereon. This action, which takes place in several steps as the machine rotates, is illustrated in Fig. 5. The detailed construction of the upper and lower molds is illustrated in Figures 3 and 4.

In Figure 3, the upper mold 9 is slidably mounted in a chamber 25 which is preferably formed integral with the upper turret 3. The upper mold 9 comprises an elongated cylindrical hollow tube 26 and an elongated plunger 27, the lower end of which is designed to form the inner cone 20 of the button 19, slidably mounted within the tube 26 and seated on a shelf 54 formed integral with the tube 26. A helical spring 28 is threaded over the upper portion of the tube 26 and is seated on the rim 29 of the chamber 25. A threaded cap 30 is mounted in the top of the tube 26 and is engaged by the upper end of the spring 28. Another helical spring 31 is disposed within the hollow tube 26 and seated on top of the upper end of the plunger 27. The top of this spring 31 is engaged by that portion of the cap 30 which extends within the tube 26. That portion of the tube 26 which is disposed beneath the turret 3 is of greater diameter than the portion which lies within the chamber 25 and this defines a flange 32 which abuts against the bottom face of the turret 3. The lower end of the plunger 27 is provided with a protruding pin or tip 33 which aids in the formation of the aperture 23 in the base 22 of the button.

In Figure 3, the lower mold 10 is slidably mounted in the lower turret 4. The lower mold 10 comprises an elongated cylindrical tube 34 with a cylindrical head 35 of larger diameter than the tube on the upper end thereof and seated on a shelf 55 in the turret 4, and a cylindrical block 36 on the lower end thereof. A helical spring 37 which encircles tube 34, is seated on a rim 38 of the block 36 and is in turn partially enveloped by a chamber 39 which is preferably formed integral with the lower turret 4. A threaded bolt 40 with a hemispherical head 41 is screwed into the base of the block 36.

A more detailed view of the lower mold mechanism is shown in Figure 4. The tube 34 is divided into an upper chamber 42 and a lower chamber 43 by a shelf 44 with an aperture therein. An elongated aperture plunger 45 is slidably mounted in the upper chamber 42. The lower end of the plunger 45 is internally threaded to receive a stop screw 51 which extends from the lower chamber 43 through the aperture in the shelf 44. A helical spring 46 is seated on the end of the stop screw 51. This spring 46 supports a pin 47, the head 48 of which is seated on a shoulder 56 in the plunger 45. A helical spring 49 is disposed in the lower chamber 43. This spring is seated on a set screw 53 which closes the lower end of the tube 34 and its upper end engages the head 50 of the stop screw 51.

The several operational steps which effect the fabrication of the glass button 19 of Figure 2 from the continuous stream of molten glass which flows from the glass tank 15 (Figure 1) onto the lower turret 4 are illustrated in Figure 5 and subsequent figures. As pointed out above, the ribbon of molten glass is fed onto the turret 4 by the rollers 17. The speed of rotation of the rollers 17 is adjusted with reference to the speed of rotation of the shaft 5 to which the turrets 3 and 4 are keyed to insure the proper rate of feed of the stream of glass to the button forming machine.

In Figure 5, the stream of molten glass is fed onto the lower turret 4 from the left. For purposes of clarity, the stream of molten glass has not been illustrated in this figure. As mentioned above, fabrication of the button 19 is effected by the action of the molds 9 and 10 on the stream of glass. Actuation of the molds 9 and 10 is effected by their engagement with cams 11 and 13 respectively during a portion of each cycle of rotation of the turrets 3 and 4 in which molds 9 and 10 respectively are mounted.

The operational steps which effect the fabrication of the button 19 are described below with reference to Figures 4, 5 and 6A, B, C, D, E, F, G and H. The actual moulding of the button is accomplished between station A and station D (Figure 5). Prior to station A, i. e., before either the upper or the lower molds are actuated by their respective cams, the several parts of each mold are disposed substantially as shown in Figures 3 and 4.

As the upper mold 9 moves into station A, the cap 30 engages the cam 11, causing the mold 9 to begin its downward stroke. Figures 6A and 6B illustrate the action which takes place between station A and station B. In Figure 6A, the head 57 of the plunger 27 of the upper mold 9 has started the formation of the inner cone of the button and the pin 33 has almost completely pierced the ribbon of glass 16, leaving only a thin flash which sets very quickly. In Figure 6B the upper mold continues its downward stroke causing the pin 33 of the upper mold to engage the pin 47 of the lower mold, piercing the thin flash of glass, and depressing the pin 47. By delaying the final formation of the aperture 23 in the button until after a thin flash has been formed and has had time to set, a clean aperture free from ragged edges is insured. Depression of the pin 47 causes the head 48 thereof to recede from its seating engagement with the shoulder 56 and the spring 46 to be compressed. At this point, (Fig. 6B) the head 57 of the plunger 27 of the upper mold has seated itself on the top of the plunger 45 of the lower mold.

Figure 6C illustrates the position of the two molds at station B. At station B the upper mold has completed its full downward stroke. The head 57 of the plunger 27 of the upper mold which seated itself on top of the plunger 45 of the lower mold has pushed the plunger 45 downwardly and causes it to seat itself on the shelf 44 which divides the tube 34 into an upper chamber 42 and a lower chamber 43. Depression of the plunger 45 causes the stop screw 51 which is threaded therein to move downwardly and compress spring 49. The distance $h$ between the periphery of the cylindrical head 35 of the lower mold and the periphery of the head 57 of the plunger 27 of the upper mold defines the height of the vertical section 24 of the button 19.

Figure 6D:
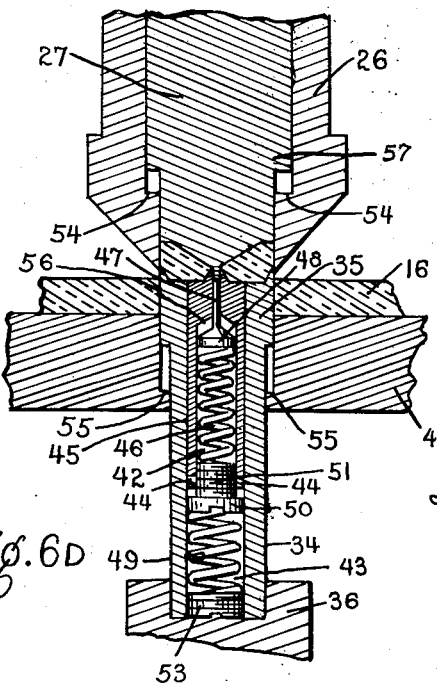

At station B (Figure 5), the hemispherical head 41 of the lower mold has engaged the cam 13. As the machine rotates and the molds move from station B to station C, the contour of the cam 13 is such that it causes the lower mold to begin its upward stroke. As shown in Figure 6D, the upward movement of the lower mold causes the cylindrical head 35 of the lower mold to rise from its seat on shelf 55 in the turret 4. As this upward movement continues it forces the plunger 27 of the upper mold to move upwardly and rise from its seat on shelf 54 in tube 26, thus causing the spring 31 (Fig. 3) to contract. At this point the button 19 has been completely formed. Figure 6D shows the position of the several elements at station C. The full upward stroke of the lower mold has been completed. The cylindrical head 35 of the lower mold has telescoped within the tube 26 and effected a shearing of the button from the ribbon of glass and formed the vertical section 24 of the button (Fig. 2).

Figure 6E:
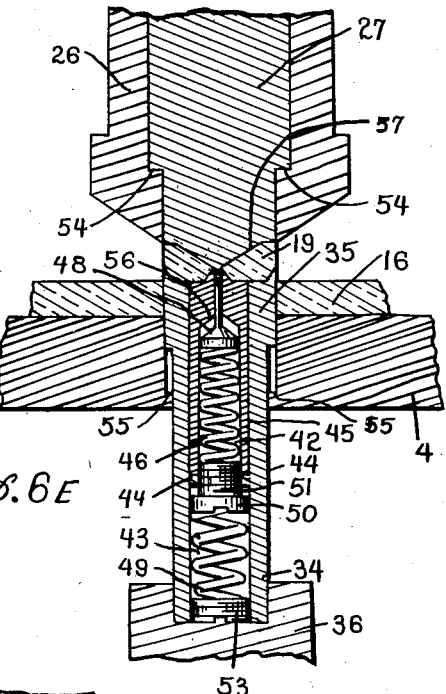

As the machine rotates and the molds move from station C toward station D the contour of the cam 11 is such that it permits the spring 28, which was compressed in the downward stroke of the upper mold, to expand and draw the tube 26 upwardly. The simultaneous upward movement of the tube 26 effected by the expansion of the spring 28 and the downward force exerted by the expanding spring 31 on the plunger 27 causes the reseating of the plunger 27 on the shelf 54 of the tube 26. In Figure 6E the plunger 27 is shown seated on the shelf 54. This figure also shows the upper mold retracted from the position shown in Figure 6D where the cylindrical head 35 of the lower mold had telescoped within the tube 26 of the upper mold. The button 19 is seated on the cylindrical head 35 of the lower mold and is disposed above and out of contact with the ribbon of glass 16 from which it has been fabricated.

Figure 6F:
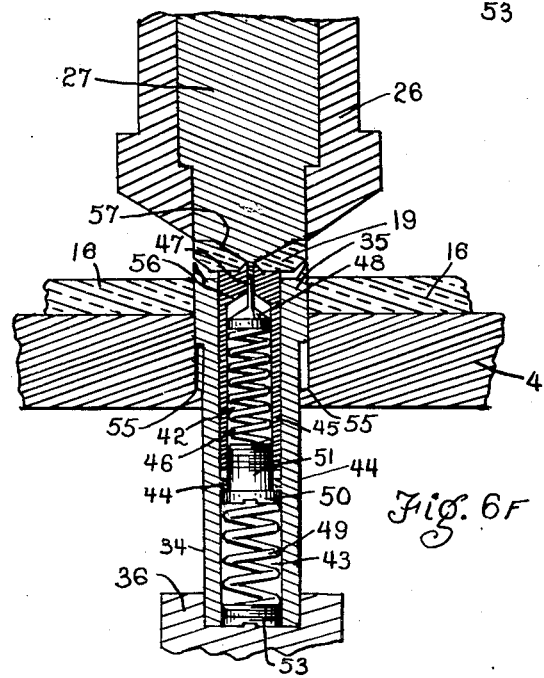

In Figure 6F, as in Figure 6E, the upper mold is continuing its return stroke as the machine rotates from station C to station D. As the upper mold continues its rise, the downward pressure exerted by the head 57 on the plunger 45 is relieved and thus permits the spring 49 in the lower chamber 43 of the lower mold 10 to expand and push the screw 51 upwardly. Since the screw 51 is threaded in the plunger 45, this causes the plunger 45 to move upwardly and results in the head 50 of the screw 51 reseating itself against the shelf 44. This upward movement of the plunger 45 carries the button 19, which is seated thereon, with it, thus moving the lower portion of the button 19 out of contact with the inner face of the cylindrical head 35. This permits the button to cool more quickly.

Figure 6G:
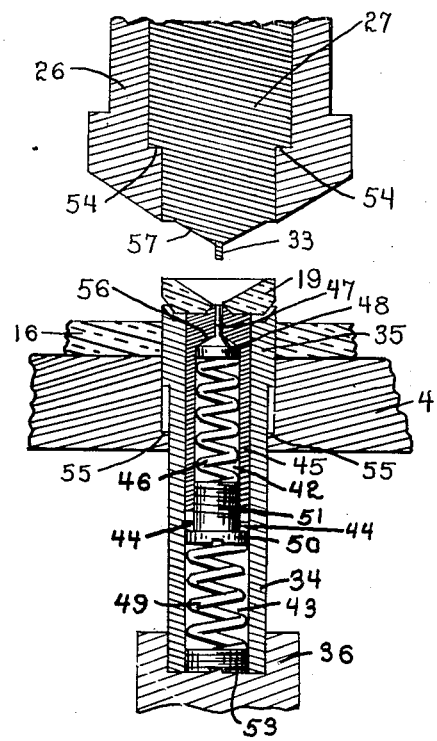

In Figure 6G the machine has rotated to station D. At station D the return stroke of the upper mold has been completed. The pin 33 of the plunger 27 of the upper mold has withdrawn from its position within the plunger 45 of the lower mold and permitted the spring 46 to push the pin 47 upwardly and cause the head 48 thereof to reseat itself on the shoulder 56 in the plunger 45.

Figure 6H:
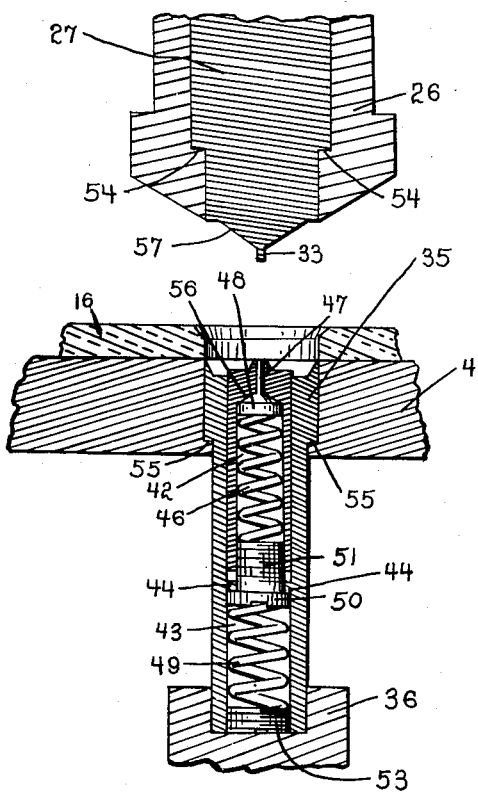

We have found it advantageous to have the lower mold retained for several stations in the same position it is disposed at station D, Figure 6G, to permit the button 19 to cool. After the button has cooled sufficiently it may be removed by any suitable means, such as for example a blast of air which blows it into a suitable receptacle. After the button has been removed the lower mold moves out of engagement with its cam 13, dropping the entire mold and effecting a reseating of the cylindrical head 35 on the shelf 55 in turret 4 (Figure 6H). After the button has been removed, the used ribbon of glass from which the button has been fabricated is directed from the turret 4 into a suitable container therefor.

What we claim is:

1. Apparatus for fabricating an article with an aperture therein from a body of moldable insulating material, said apparatus comprising: a male mold comprising a hollow tube internally threaded at one end thereof and having an internal shelf formed therein at the other end thereof, a plunger slidably disposed in said tube and normally seated on said shelf, said plunger having a hole-forming tip on one end thereof, a spring seated on the other end of said plunger, and a threaded cap mounted on the threaded end of said tube, the inner end thereof engaging said spring; a female mold in register with said male mold; means for effecting a flow of moldable insulating material therebetween; and means for bringing said molds into engagement with one another.

2. Apparatus for fabricating an article with an aperture therein from a body of moldable insulating material, said apparatus comprising: a male mold comprising a hollow tube internally threaded at one end thereof and having an internal shelf formed therein at the other end thereof, a plunger slidably disposed in said tube and normally seated on said shelf, said plunger having a hole-forming tip on one end thereof, a spring seated on the other end of said plunger, and a threaded cap mounted on the threaded end of said tube, the inner end thereof engaging said spring; a female mold in register with said male mold, said female mold comprising a hollow tube having an enlarged cylindrical head on one end thereof and an internal shelf intermediate the ends thereof defining an upper and a lower chamber therein, a plunger slidably disposed in said upper chamber and extending through the cylindrical head on an end of said tube of the female mold, said plunger having an aperture in an end thereof in register with the hole-forming tip on an end of the male mold plunger; means for effecting a flow of moldable insulating material between said molds; and means for bringing said molds into engagement with one another.

3. Apparatus for fabricating an article with an aperture therein from a body of moldable insulating material, said apparatus comprising: a male mold comprising a hollow tube having an internal shelf formed therein at one end thereof and a plunger slidably disposed in said tube and normally seated on said shelf, said plunger having a hole-forming tip on one end thereof; means for imparting a work-forming stroke to said mold; means for effecting the return stroke of the hollow tube of said mold; means for effecting the return stroke of the plunger of said mold; a female mold in register with said male mold, said female mold comprising a hollow tube having an enlarged cylindrical head on one end thereof and an internal shelf intermediate the ends thereof defining an upper and a lower chamber therein, a plunger slidably disposed in said upper chamber and extending through the cylindrical head on an end of said tube of the female mold, said plunger having an aperture in an end thereof in register with the hole-forming tip on the male mold plunger; means for imparting a work-forming stroke to said female mold; means disposed in the lower chamber of the hollow tube of the female mold for effecting the return stroke of the female mold plunger; and means for effecting the return stroke of the hollow tube of the female mold.

4. Apparatus for fabricating an article with an aperture therein from a body of moldable insulating material, said apparatus comprising: a male mold comprising a hollow tube having an internal shelf formed therein at one end thereof and a plunger slidably disposed in said tube and normally seated on said shelf, said plunger having a hole-forming tip on one end thereof; a female mold in register with said male mold, said female mold comprising a hollow tube having an enlarged cylindrical head on one end thereof and an internal shelf intermediate the ends thereof defining an upper and a lower chamber therein, a plunger slidably disposed in said upper chamber and extending through the cylindrical head on an end of said tube of the female mold, said plunger having an aperture in an end thereof in register with the hole-forming tip on an end of the male mold plunger; means for effecting a flow of moldable insulating material between said molds; and means for bringing said molds into engagement with one another.

ADDISON B. SCHOLES.
OLIVER MANN.

REFERENCES CITED

The following references are of record in the file of this patent:

UNITED STATES PATENTS

| Number | Name | Date |
|---|---|---|
| 353,461 | Otterson | Nov. 30, 1886 |
| 696,254 | Nash | Mar. 25, 1902 |
| 1,770,335 | Fuwa | July 8, 1930 |
| 1,977,162 | Wilcox | Oct. 16, 1934 |

FOREIGN PATENTS

| Number | Country | Date |
|---|---|---|
| 797,345 | France | Apr. 24, 1936 |

OTHER REFERENCES

Ser. No. 423,106, Mickley (A. P. C.), published April 27, 1943.